United States Patent [19]

Foreman et al.

[11] 4,033,878
[45] July 5, 1977

[54] SPIRAL WOUND MEMBRANE MODULE FOR DIRECT OSMOSIS SEPARATIONS

[75] Inventors: Gerald E. Foreman, San Diego; Peter K. Worsley, Santa Barbara, both of Calif.

[73] Assignee: Universal Oil Products Company, Des Plaines, Ill.

[22] Filed: May 12, 1975

[21] Appl. No.: 576,925

[52] U.S. Cl. .................. 210/321 A; 210/336; 210/433 M; 210/494 M
[51] Int. Cl.² .................................... B01D 31/00
[58] Field of Search .......... 55/16, 158; 210/321 R, 210/335, 456, 494 M, 336, 433 M, 321 A

[56] References Cited
UNITED STATES PATENTS

| | | | |
|---|---|---|---|
| 3,734,297 | 5/1973 | Windle | 210/321 R |
| 3,778,369 | 12/1973 | Markley | 210/456 X |
| 3,827,564 | 8/1974 | Rak | 210/321 R |
| 3,852,198 | 12/1974 | Murakami | 210/456 X |
| 3,872,014 | 3/1975 | Schell | 210/321 R |

Primary Examiner—Thomas G. Wyse
Assistant Examiner—Robert H. Spitzer
Attorney, Agent, or Firm—James R. Hoatson, Jr.; Philip T. Liggett; William H. Page, II

[57] ABSTRACT

A membrane module is made from at least one pair of spaced membrane sheets that are interposed between spaced porous material sheets and all of the layers of sheets are in turn spirally wound around an axially positioned hollow mandrel that has at least one internal flow blocking means therein and side-wall openings connective to an internal portion of one of said porous sheets such that a first fluid flow can pass outwardly from a portion of the mandrel into a portion of the connecting porous layer and into the envelope resulting from the encompassing membranes and then back into another portion of the mandrel such that at least one out-to-in flow will be made through the membrane envelope, while a second fluid stream is passed through the next adjacent porous material layers to carry the fluid which has permeated through the membranes. One or more modules can be maintained in a pressure tight, elongated housing to provide an operation where one fluid is passed through the mandrel portions and through the layers of a first porous material and the membrane envelopes while a second fluid can pass longitudinally through the container and through the spaced layers of the other porous material to result in an operation whereby one fluid stream will be concentrated and the other fluid diluted from osmotic fluid flow passing through the membrane layers.

3 Claims, 7 Drawing Figures

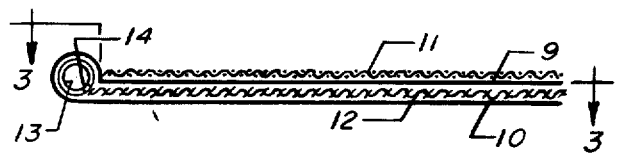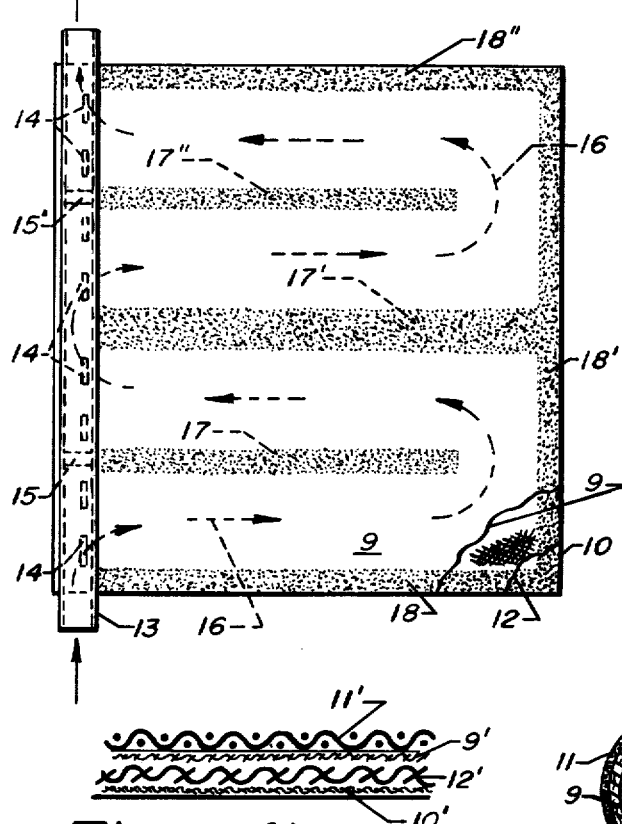

SPIRAL WOUND MEMBRANE MODULE FOR DIRECT OSMOSIS SEPARATIONS

The present invention relates to a special modification of a spiral wound membrane module which may be used as a dialyzer or for direct osmosis separations.

More particularly, the invention is directed to a special form of spiral wound module where spaced membrane layers and interposed grids or porous media layers, one of which will connect to a central hollow mandrel, can provide for achieving a high membrane area to volume ratio at a low cost.

The present module will generally be operated at low pressures as compared with reverse osmosis modules and the containment vessel or housing for the one or more modules in any one unit can be made of plastic or other inexpensive material. Typically, the present module will be utilized to effect a dewatering or stream concentrating function. For example, orange juice or other fruit juice streams can be concentrated or sewage contaning relatively large amounts of water can be processed through the present type of unit to effect a dewatering step and reduce the overall volume of sewage to be temporarily stored or subsequently processed. On board large ships the reduction in the volume of the sewage can be of particular advantage and sea water can readily be used to act as the high osmotic pressure solution to be diluted and carry away the excess water. Also, in a dialysis type of operation, colloids can be separated from molecular or ionic dissolved impurities. In this instance, the solution with the colloid and dissolved impurities is passed over the outside of the envelope and water, or other suitable solvent, is passed through the interior of the envelope because the colloids will not pass through the membrane and the dissolved impurities will pass through to leave a substantially purified colloid solution.

Many other types of separation operations can, of course, be carried out with a osmotic membrane module of the present construction and arrangement. Actually, the present construction provides a relatively inexpensive module which ca be considered disposable. Also, since there is a "single pass" operation being utilized, then a plurality of spiral wound elements can be used in series within a single elongated chamber.

Thus, it may be considered a principal object of the present invention to provide a spiral wound membrane module which can accommodate two different fluid streams such that one stream can pass fluid through the membrane under osmotic pressure and effect a dewatering, purification, or concentrating function, while, the passed through fluid effects a diluting effect on the second fluid stream.

It is also an object of the present invention to provide a membrane type separation unit, as heretofore noted, which is relatively inexpensive in providing a high membrane area to volume ratio and which can operate at relatively low pressures such that comparatively low cost, low pressure pump means and low pressure housing means ca be employed in the systems.

Actually, the present invention may be considered a modification of a presently used type of spiral module which has been used in reverse osmosis operations. Specifically, reference may be made to U.S. Pat. Nos. 3,367,504 and to 3,417,870 where spiral wound membrane and grid or fluid channel layer constructions are described and illustrated. Of course, in reverse osmosis operations, it is necessary to use relatively high pressure flow conditions to make the desired separations. For exmple, where ordinary sea water is disposed on one side of a suitable semipermeable membrane and a relatively pure water solution is present on the other side, reverse osmosis will begin to occur when the sea water is subjected to a pressure of approximately 350 p.s.i.a. Conversely, for direct osmosis, water will typically diffuse from a first solution having a lower osmotic pressure through the semipermeable membrane into a second solution having a higher osmotic pressure. Thus, where direct osmosis concentrations and separations are to be carried out, low applied pressure systems can be used and fluid stream pressures will merely be sufficient to overcome system pressure drops and provide desired rapid flows of the two streams.

In a broad embodiment, the present invention provides a spiral wound membrane separation module, which comprises in combination; (a) a hollow mandrel having at least one flow blocking means in the interior portion thereof and having passageway means through the wall portion thereof, (b) a sheet-like layer of a first porous material provided in a spaced spiral wrapping around said mandrel and having one end in contact with the passageway means to the interior of said mandrel to permit fluid flow from one to the other, and (c) said porous material further having elongated fluid flow blocking means incorporated within the interior portion thereof, with at least one such seal means being in alignment with the flow blocking means in said mandrel and extending for a portion of the spiral wound length thereof in the manner of interior weir means, as well as fluid blocking means incorporated around the side and outer end portions thereof, whereby fluid flow will be caused to travel in at least one flow path that is from one mandrel portion out into the outer spiral wrapped length of the porous material and then back into another mandrel portion, (d) a membrane sheet positioned each side of said first porous material with outer edge portions sealed to the latter to provide an envelope arrangement therewith and such envelope spirally wrapped around said mandrel along with layer of a second porous material hereinafter set forth, to provide resulting membrane layers between spiral wound porous material layers, and (e) a sheetlike layer of a second porous material interposed between said envelope and between the membranes in the spirally wound arrangement therewith to be thus spaced from said first porous material layer by one of said membranes in a resulting spiral wound module.

The module may be made with additional layers of membrane and porous layer material such that additional envelopes and channels may be provided in any one module to accommodate the feed stream to be concentrated and stream to be diluted; however, in each instance provision will need to be made to provide passageway means from the central hollow mandrel into and outwardly therefrom into each encased porous media in the sealed envelope arrangements such that the streaam being passed through the hollow mandrel around the weir means will be divided and flow into each envelope section. Typically, slots or series of holes through the central tube or mandrel will provide for effecting a fluid passageway into the channel material or porous media which is in direct contact with the surface of the mandrel at the zone of the passageway means to, in turn, permit the in-and-out flow of the fluid medium passing through the central tube or mandrel. In the event that the feed material to be concentrated is to be introduced into the central mandrel or hollow tube section, then there will be an outward flow through the connecting porous material and through the adjacent membrane surfaces. On the other hand, where the feed material to be concentrated, or undergo a particular separation, is being fed into an encompassing housing and passed longitudinally through the module in a suitable channel or grid material, then the osmotic flow will be inwardly through the membrane layers into the next adjacent layers of porous media and into the more concentrated solution being passed through the central slotted tube means.

Also, as will be more fully described hereinafter, there can be a plurality of flow blocking means in each mandrel and an accompanying plurality of blockage means in the porous material of the envelope such that a serpentine type of fluid flow is provided in each envelope, with more than one out-to-in flow paths provided in each envelope. The resulting elongated flow path is of particular value in providing an increased effective membrane area for each envelope and for each module that may be in any one casing.

In accordance with the present invention, a suitable separation device or apparatus will embody an elongated pressure tight chamber or housing and at least one of the aforesaid types of modules having the spiral wound alternate layers of membrane material and porous media, with one of the layers of porous media having edge seal means and being connective to the central mandrel through suitable passageway means and, in addition, the central tube or mandrel will have suitable blocking means in order to insure at least one fluid flow path for the fluid to pass out through the porous media and back into another portion of the central tube. The encompassing housing will provide suitable fluid ports, or inlet and outlet means, to channel the flow of one fluid into one end of a central tube and out the other end thereof, while additional port means and seal means around the module and against the inside wall of the casing will provide for passing the second fluid stream into one end of the encompassing pressure tight housing and out the other end thereof such that there will be a generally longitudinal fluid flow through the unsealed alternate layers of porous media comprising the spiral wound module.

As heretofore noted, in view of the generally low applied pressure operations which may be carried out in the present type of modified module for direct osmosis separations, or dialysis separations, the central tube and confining housing, as well as other component parts, may well be made of suitable lower cost materials rather than of high pressure resistant materials.

The membrane material can be made of cellulose acetate or of other suitable membrane materials known to those familiar with the reverse osmosis and direct osmosis arts. The membrane can be cast, or otherwise made, by conventional methods not comprising a part of the present invention. However, where high applied pressures are to be used in a particular system, then it may be advisable to have the membrane cast on a suitable support material such as various felts or fabrics, including graphite cloth, glass fiber cloths, or a fine weave cloth support such as fine woven nylon or Dacron sailcloth. The support fabric does provide convenience in the handling of the membrane during the fabrication of a spiral wound module, but will increase the cost such that it is not practicable except in high applied pressure operations where the sailcloth backing also assists in precluding deformation of the membrane into a screen or channel material which, in turn, may comprise suitable tricot or netting type materials.

Various types of screens or nettings may be utilized to provide the heretofore set forth "porous media" or "chanel" material for the passage of the feed and products streams and it is not intended to limit the present invention to any one type of open porous media. Specifically, the channel material or porous media between alternate layers of the membrane materials may comprise a Dacron tricot or a spun polyester such as Vexar or Reemay that are manufactured by duPont, etc. Also, preferably the channel material will be impregnated with a suitable resin such as melamine formaldehyde to provide reinforcement. The particular material chosen may vary in accordance with the type of feed stream being passed through the spiral wound modules as well as with respect to the type of solution which will be diluted by the passage of water from the feed stream.

The present modified form of spiral wound module and its advantages in carrying out direct osmosis or dialysis types of separation procedures may be better set forth and described by reference to the accompanying drawing and the following descriptions thereof.

FIG. 1 of the drawing indicates diagrammatically the use of a membrane in a direct osmosis operation.

FIG. 2 of the drawing indictes how alternate layers of membrane and porous media may be arranged to provide for spiral winding around a central hollow tube.

FIG. 3 of the drawing provides a plan view, such as indicated by the line 3—3 in FIG. 2, how sheet-like membrane materials spaced each side of a porous media layer which is connected to passageway means in a central tube can provide an envelope for the passage of a fluid stream from one end portion of the tube out into the connective porous media around blocked off portions in the central mandrel, as well as in the portion of the porous media, and then back into the other end portion of the central tube to be discharged therefrom.

FIG. 4 of the drawing indicates diagrammatically how the aternate layers of the membrane and porous material will be spirally wound around the open central tube member and, in addition, be encased in a confining housing to provide a suitable separation apparatus.

FIGS. 4a and 4b further diagrammatically indicate the placement of membrane members with the channel materials as they may be embodied in a particular module.

FIG. 5 of the drawing is a longitudinal sectional view indicating the use of a plurality of modules in an elongated pressure tight housing to further illustrate how a plurality of modules may be utilized in a series flow arrangement.

With reference to FIG. 1 of the drawing, there is merely indicated a diagrammatic direct osmosis operation whereby one fluid stream is being concentrated, or dewatered, by having the osmotic flow of water from one stream into a second stream of higher osmotic pressure that will be diluted to the extent of the osmotic flow across the membrane layer. Specifically, there is indicated a feed stream A, which is to undergo concentration, or dewatering, being passed through a line 1 into a chamber 2 of a vessel means 3 whereby there will be the continuous passage of water through membrane 4 into a second compartment 5 and the resulting discharge of a more concentrated fluid A at outlet means 6. At the same time, a fluid B, having a higher osmotic pressure than fluid A, is introduced by way of inlet 7 into a chamber portion 5 and is discharged by way of outlet 8 in a somewhat more dilute condition.

Many types of processing operations may utilize the present spiral membrane module with its high membrane area to volume ratio to advantage in effecting concentrating procedures. For example, as heretofore noted, orange juice or other fruit juice drinks may be dewatered and concentrated by utilizing the present module in a system such as set forth in FIG. 1. Alternatively, the same type of module may be utilized to advantage is a dialysis type of operation, for example, the separating of colloids from a stream containing dissolved impurities. However, in this latter instance, since the colloids do not pass through aa semipermeable membrane they will be retained in the feed stream and the dissolved impurities will be passed through the membrane layers into the adjacent stream flow which will be diluted with the water and impurities carried through the membrane. In another example, a dialysis membrane may be used in a module for purifying a blood stream, where the nitrogenous waste products and other toxins will be removed by osmotic flow into a suitable artificial plasma stream, or other desired stream, flowing on the other side of the membrane.

Referring now particularly to FIGS. 2 and 3 of the drawing there is shown the placement of alternate layers of membranes 9 and 10 spaced with respect to channel or porous media layers 11 and 12 which extend outwardly from a hollow tubular member 13. One of the porous material layers 12 is indicated as connecting to the outer surface of tube 13 at the zone of slotted passageways 14 such that there may be fluid flow from the interior of the tube 13 out into the porous material 12 and then back into another portion of the tube, as best shown in FIG. 3 of the drawing. Also, as best shown in FIG. 3, the central portion of tubular member 13 is indicated as being provided with solid blocking means 15 and 15', such that fluid flow will be shunted out into the porous material 12 in the manner of the dashed arrows 16. Still further, there will be flow blocking material 17, 17' and 17", which will extend as narrow walls or weirs within the porous material 12, whereby fluid flow will be in a serpentine path through the porous channel material, as viewed in FIG. 3. In other words, flow wll be from the inlet end portion of tube 13 outwardly around a first seal means 17 and then back into tubing 13 to be shunted to the other side of seal 17' by blocking 15' and then pass around the seal 17" back to the outlet end of tube 13. Alternatively, another blocking means, such as 15, could be placed in the center of the mandrel and the seal 17' stopped short of the mandrel to permit the reversal of fluid flow direction to take place in the envelope, rather than return to the interior of the mandrel. The weirs or sealed zones 17, 17' and 17" may be provided by blocking a portion of the porous media with a solid resin or epoxy adhesive type of material in a manner to substantially preclude fluid flow through that portion of the porous material. Also, as indicated at the shaded portions 18, 18' and 18", around the edge portion of the membrane layers 9 and 10 and the porous channel material 12, there will be a suitable epoxy adhesive and channel blocking material such that fluid flow will be retained between the spaced membranes 9 and 10 and provide, in effect, a closed envelope within the porous media 12. As indicated in FIG. 2, the sectional view 3 is taken along section line 3—3 so that the upper porous or channel material 11 is not being shown in FIG. 3 of the drawing. However, the second, or alternating, porous material 11, which is positioned as indicated in FIGS. 2 and 4, will not have a seal material or adhesive material at the outer end portions such that fluid flow may be accommodated longitudinally or parallel to the tube 13 through the channels thereof in a free flowing manner from one end of the module to the other, even after all of the layers are in the spiral wrap form as indicated in FIG. 4 of the drawing. In other words, a fluid to be concentrated, such as fluid A in FIG. 1, may be passed in an end-to-end manner through the porous channel material 11 while a suitable higher osmotic pressure solution to be diluted, in the manner of fluid B indicated in FIG. 1, would be passed into the mandrel or central tube 13 to be then passed through the envelope between spaced membranes 9 and 10 in the manner of dashed arrows 16 in FIG. 3 to eventually be returned to the downstream end of the tube 13 and thence outwardly from its downstream open end. Thus, water from the stream to be concentrated would pass through the membrane layers 9 and 10 into the porous media 12 of the envelope arrangement and into the fluid stream to be diluted which is passing through the mandrel portion of the module.

FIG. 3 indicates two flow paths away from the central mandrel 13 and two flow paths toward the latter as part of the single serpentine flow; however, it is to be understood that there may be a single barrier 17 to provide a single outward and a single inward flow or there may be a greater number of flow barriers to provide a still greater length of flow path for the fluid in passing through the envelope provided by membranes 9 and 10 in a single module.

FIG. 4 indicates diagrammatically the use of a suitable elongated cylinder-form housing 19 to encompass a spiral wound module such as resulting from the spiral winding of the alternate membrane and porous media layers (such as shown in FIGS. 2 and 3) around central tube 13. Although not shown in the drawing, a nonpermeable plastic tape or other suitable wrap material will be placed around the module to, in turn, hold the wound layers in a tight and sized cylinder form suitable for handling and for mounting in the housing 19, as well as preclude fluid from bypassing the membrane surfaces.

In FIG. 4a of the drawing, there is shown an enlarged view of a typical construction and assembly, where a tubing 13 is provided with passageway means 14 connective to a first porous media 12 and the latter is, in turn, generally encased by spaced membrane layers 9 and 10. Encompassing the outer membrane layer 10 is a second porous media or channel material 11 to provide a flow channel for a second fluid stream. When all of the layers 9, 10, 11 and 12 are spirally wrapped around tubular member 13, there will be a resulting spiral wound module comprising alternate layers of membrane and interposed layers of porous channel material. As heretofore noted, the feed stream to be concentrated will be passed longitudinally through one of the channel materials such as 11, and water therefrom will pass radially inwardly from such chanel material 11 through membrane layers 9 and 10 to reach the channel layer 12 and intermingle with the solution flowing through the mandrel 13 and through the media 12.

In the event that the membrane is cast on a sailcloth backing or other suitable backing, then such backing layer will be adjacent the internal porous channel material 12 such that osmotic flow is through the encompassing membrane into porous media 12. In an alternate operation, where the stream to be concentrated is flowing through the inner tubular member 13 out into the envelope having porous media 12 between membrane layers 9 and 10, then the membrane surfaces will face the porous media 12 and suitable backing or support means will be provided on the downstream faces of the membranes adjacent the porous media or channel media 11 in the various layers of the spiral wound module.

As an illustration of this type of design, in FIG. 4b of the drawing, there is indicated the use of a channel material 12', which for example could comprise a Dacron tricot material interposed between sailcloth backed membrane layers 9' and 10'. In addition, a channel material 11' is indicated above membrane 9' such that it can be spirally wound with the other layers. The channel material 11' is diagrammatically shown as screening in the drawing; however, it may well be the same material as 12' and may comprise a tricot netting, felt, special filter paper, or whatever porous media is desired. It is also to be noted in this enlarged diagrammatic FIG. 4b, that the backing, such as a nylon or Dacron fine weave sailcloth, is shown as part of the membrane layers 9' and 10' and that such backings are adjacent channel material 12' to provide a closed envelope therewith to accommodate osmotic flow from channel material 11'.

In FIG. 5 of the drawing, there is indicated diagrammatically the placement of a plurality of modules 20 in a series flow within a container means 21 having pressure tight end seal members 22 and 23. There is also indicated inlet port and outlet port means 24 and 25 through the respective end members 22 and 23 to provide for a longitudinal flow of a fluid material A from one end of the separation chamber 21 to the other end thereof. There is further indicated the placement of inlet port means 26 suitable to introduce a second solution or fluid B into a first module 20 and an outlet port means 27 to discharge the resulting diluted solution from the downstream end of the series of modules 20. Each of the plurallity of series connected modules 20 are indicated as being internally connected to each other by suitable connector means 28. There are also shown the placement of seal means 29 around the upstream peripheral portions of each module 20 to prevent the flow of fluid B along the inside wall of the casing 21 and around each module 20. Typical forms of wedging type seals may be used for this purpose. By the use of an apparatus such as shown in FIG. 5 there can be a resulting multiple stage series flow through a plurality of modules to effect a greater volume throughput in effecting the concentration of a fluid stream, such as fluid A. However, as heretofore noted, in a direct osmosis type of device embodied in the present invention, there may be the alternate operation, where the stream to be concentrated is passed through the internal hollow tube or mandrel members and the fluid stream being diluted is passed longitudinally through the encompassing housing 21.

EXAMPLE

As an illustrative example of operation, where a solution No. 1 with a high osmotic pressure, such as brine, is passed through a spiral module from the center tube out into a first porous media (such as 12 shown in the FIG. 3 arrangement) to thus be directed between the membrane layers 9 and 10, i.e., with flow being considered inside the envelope, and a solution No. 2 to be concentrated is pumped through the module using the alternate layers of a second porous media (such as channel material 11 in FIGS. 2 and 4) and thus across the outer surface of the envelope and the membrane layers thereof, then water will pass from the solution No. 2 through the membrane into the solution No. 1.

In a specific test procedure, a solution No. 1 was a 3% sodium chloride solution and a solution No. 2 was distilled water containing a dye material. It was determined from a test run carried out over about 45 minutes that a three liter volume of water and dye (as the solution No. 2) was concentrated from 3 liters to 1.3 liters. Also, at the end of the test period during which time there was no visible passage of the dye, there was a dye concentration increased by a factor of 2.4.

From the foregoing example as well as from the prior descriptive matter, it will be obvious to those familiar with direct osmosis and reverse osmosis operations that many types of solution concentrating operations can be carried out in an economical and advantageous manner. As heretofore noted, the same type of operation and same type of modules can be used to advantage to effect various dialysis types of separations.

It is, of course, not intended to limit the present invention to any one size of module or to any predetermined number of modules in a given separation apparatus. Nor is it intended to limit the present invention to the use of any one type of membrane material or to any particular channel materials or porous media through which the two different solutions will be flowing. It is, of course, a particular feature of the present modified spiral water membrane module to make use of internal tubular blocking means and the built-in walls and/or weir means for one of the interposed layers of chanel material, or porous media, such that an elongated solution flow path will be effected through the interior of each envelope portion of a spiral wound module to insure efficient flow of such solution through the encompassed edge-sealed porous material.

We claim as our invention:
1. A spiral wound membrane separation module, which comprises in combination:
   a. a hollow mandrel having at least one flow blocking means in the interior portion thereof and having longitudinally aligned passageway means on both sides of the flow blocking means extending through the wall portion of the mandrel;
   b. a sheet-like layer of a first porous material provided in a spaced spiral wrapping around said mandrel and having one end in contact with the passageway means to the interior of said mandrel to permit fluid flow from one to the other;
   c. said porous material further having elongated fluid flow blocking seal means incorporated within the interior portion thereof, with at least one such seal means in alignment with the flow blocking means in said mandrel and extending for a portion of the spiral wound length thereof in the manner of interior weir means, as well as fluid blocking means incorporated around the side and outer end portions thereof, whereby fluid flow will be caused to travel in at least one flow path that is from one mandrel portion out into the outer spiral wrapped length of the porous material and then back into another mandrel portion;

d. a pair of membrane sheets each positioned on an opposite side of said first porous material with outer edge portions sealed to the latter to provide an envelope arrangement therewith and such envelope spirally wrapped therewith around said mandrel along with a layer of a second porous material, hereinafter described and set forth, to provide resulting membrane layers between spiral wound porous material layers;

e. a sheet-like layer of a second porous material interposed between said envelope and between the membranes in the spirally wund arrangement therewith to be thus spaced from said first porous material layer by one of said membranes in a resulting spiral wound module; and, f. said spiral wound membrane module being further characterized in that a plurality of flow blocking means are spaced longitudinally in said mandrel and a corresponding plurality of flow blocking seal means are provided in the first said porous material to provide more than one outward and inward flow paths for the fluid flow in the envelope arrangement.

2. A spiral wound membrane separation module, which comprises in combination:

a. a hollow mandrel having at least one flow blocking means in the interior portion thereof and having longitudinally aligned passageway means on both sides of the flow blocking means extending through the wall portion of the mandrel;

b. a sheet-like layer of a first porous material provided in a spaced spiral wrapping around said mandrel and having one end in contact with the pasageway means to the interior of said mandrel to permit fluid flow from one to the other;

c. said porous material further having elongated fluid flow blocking seal means incorporated within the interior portion thereof, with at least one such seal means in alignment with the flow blocking means in said mandrel and extending for a portion of the spiral wound length thereof in the manner of interior weir means, as well as fluid blocking means incorporated around the side and outer end portions thereof, whereby fluid flow will be caused to travel in at least one flow path that is from one mandrel out into the outer spiral wrapped length of the porous material and then back into another mandrel portion;

d. a pair of membrane sheets each positioned on an opposite side of said first porous material with outer edge portions sealed to the latter to provide an envelope arrangement therewith and such envelope spirally wrapped therewith around said mandrel long with a layer of a second porous material, hereinafter described and set forth, to provide resulting membrane layers between spiral wound porous material layers;

e. a sheet-like layer of a second porous material interposed between said envelope and between the membranes in the spirally wound arrangement therewith to be thus spaced from said first porous material layer by one of said membranes in a resulting spiral wound module; and, f. said spiral wound membrane module being further characterized in that a plurality of spaced pars of membrane sheets are used in said module and a plurality of the spaced interposed pars of first and second porous material layers are provided in said module to provide a plurality of envelopes therein, where membranes encompass a first porous material and each such layer of porous material is connective with passageway means to the interior of said hollow mandrel.

3. A spiral wound membrane separation module, which comprises in combination:

a. a hollow mandrel having at least one flow blocking means in the interior portion thereof and having longitudinally aligned passageway means on both sides of the flow blocking means extending through the wall portion of the mandrel;

b. a sheet-like layer of a first porous material provided in a spaced spiral wrapping around said mandrel and having one end in contact with the passageway means to the interior of said mandrel to permit fluid flow from one to the other;

c. said porous material further having elongated fluid flow blocking seal means incorporated within the interior portion thereof, with at least one such seal means in alignment with the flow blocking means in said mandrel and extending for a portion of the spiral wound length thereof in the manner of interior weir means, as well as fluid blocking means incorporated around the side and outer end portions thereof, whereby fluid flow will be caused to travel in at least one flow path that is from one mandrel portion out into the outer spiral wrapped length of the porous material and then back into aother mandrel portion;

d. a pair of membrane sheets each positioned on an opposite side of said first porous material with outer edge portions sealed to the latter to provide an envelope arrangement therewith and such envelope spirally wraped therewith around said mandrel along with a layer of a second porous material, hereinafter described and set forth, to provide resulting membrane layers between spiral wound porous material layers;

e. a sheet-like layer of a second porous material interposed between said envelope and between the membranes in the spirally wound arrangement therewith to be thus spaced from said first porous material layer by one of said membranes in a resulting spiral wound module;

f. said spiral wound membrane module being further characterized in that such module is encompassed in an elongated pressure tight container means to encompass both the central hollow mandrel and the spirally wound layers of membranes and said layers of first and second porous materials, fluid inlet and outlet means are provided to the ends of said container and to the ends of said mandrel to provide for a fluid flow through first said porous material and said envelope, and additional fluid inlet and outlet means are provided to the opposing end portions of said container whereby a second fluid stream can pass through the interior of the container and through said second porous material layer of said spiral wound module; and, g. the apparatus being still further characterized in that a plurality of spiral wound membrane modules are series connected at adjacent open end portions of the central hollow mandrels to result in a series flow through successive modules within said container whereby the same fluid can be passed in series through the plurality of series connected modules in said container, and seal means are provided between the exterior of each module and the interior wall of the container to preclude fluid flow therebetween.

* * * * *